E. C. SIEBERT.
GRASS CATCHER FOR LAWN MOWERS.
APPLICATION FILED JAN. 12, 1911.
1,025,593.
Patented May 7, 1912.
2 SHEETS—SHEET 1.
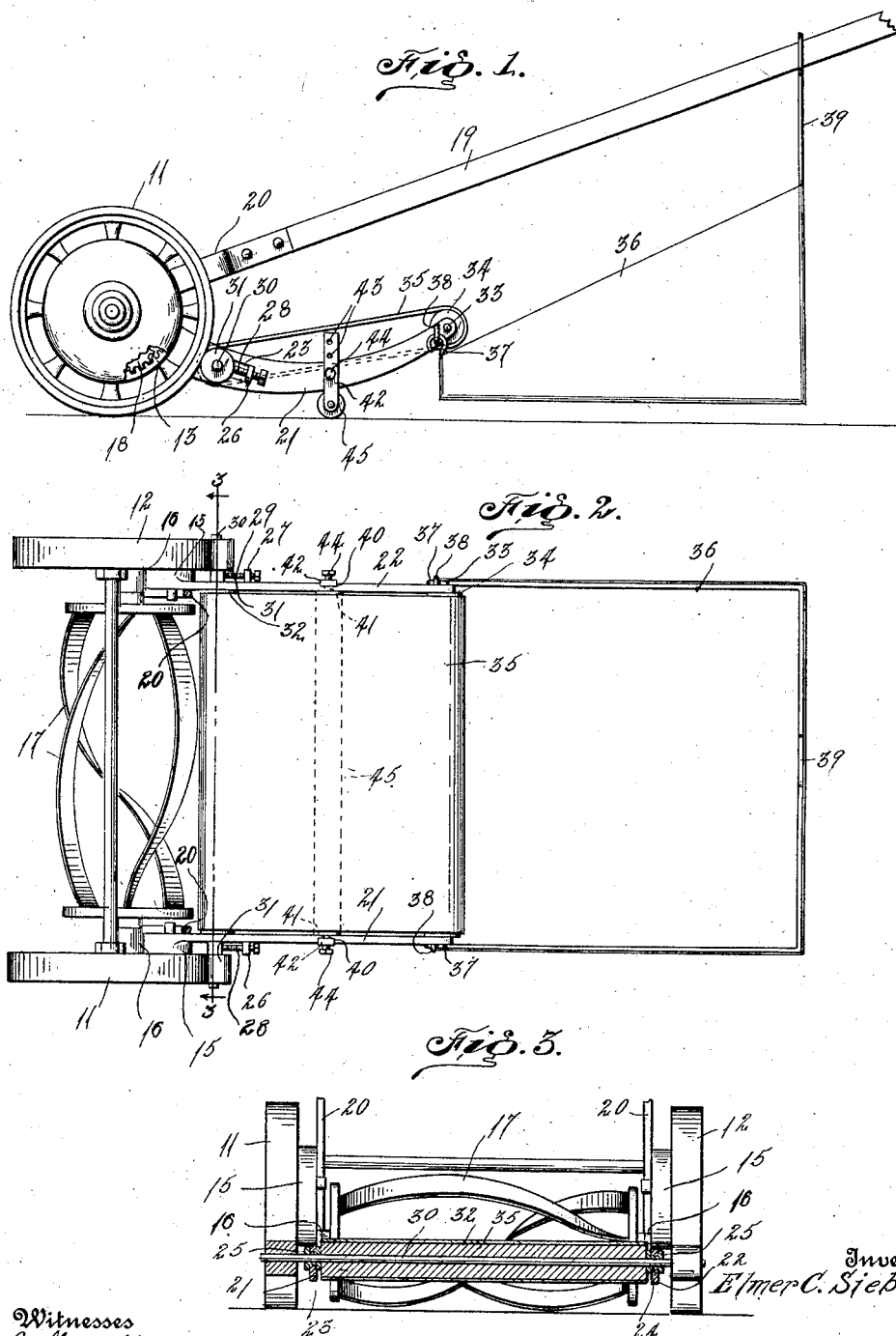

E. C. SIEBERT.
GRASS CATCHER FOR LAWN MOWERS.
APPLICATION FILED JAN. 12, 1911.
1,025,593.
Patented May 7, 1912.
2 SHEETS—SHEET 2.
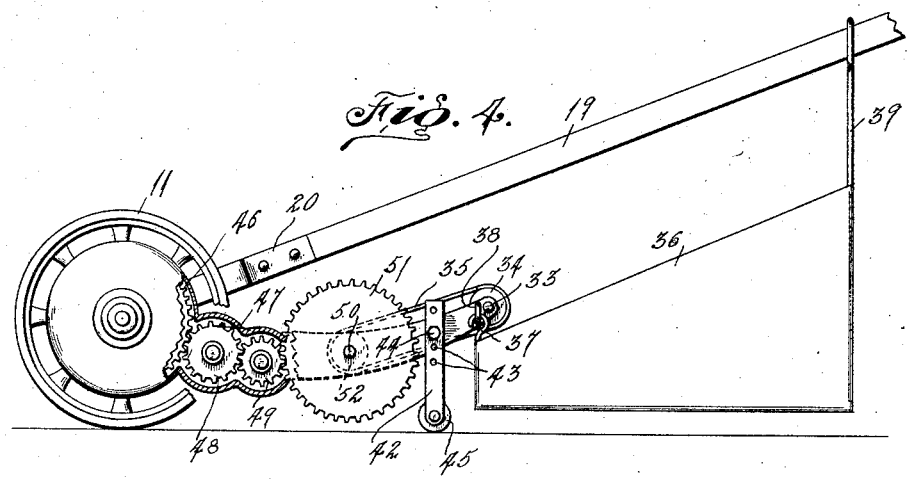
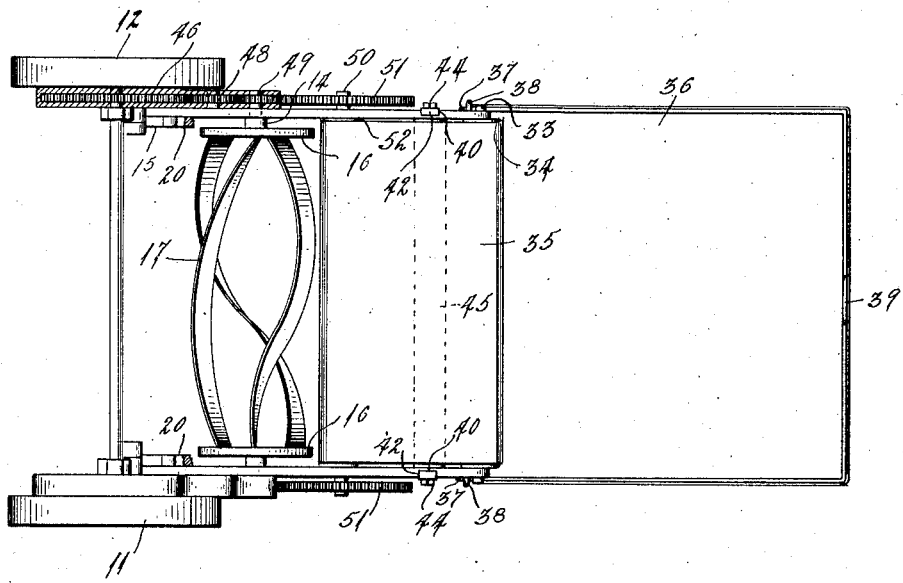
Witnesses
Jos Gregory
Henry T. Bright
Inventor
Elmer C. Siebert
By Chandler & Chandler
Attorneys

UNITED STATES PATENT OFFICE.

ELMER C. SIEBERT, OF BELLEVILLE, ILLINOIS.

GRASS-CATCHER FOR LAWN-MOWERS.

1,025,593.  Specification of Letters Patent.  Patented May 7, 1912.

Application filed January 12, 1911. Serial No. 602,249.

*To all whom it may concern:*

Be it known that I, ELMER C. SIEBERT, a citizen of the United States, residing at Belleville, in the county of St. Clair, State of Illinois, have invented certain new and useful Improvements in Grass-Catchers for Lawn-Mowers; and I do hereby declare the following to be a full, clear, and exact description of the invention, such as will enable others skilled in the art to which it appertains to make and use the same.

This invention relates to grass catchers for lawn mowers.

The object of the invention resides in the provision of a device of the character named, which is adapted to convey grass as rapidly as cut into a suitable receptacle, which latter is detachable so that when filled it may be removed and emptied.

With the above and other objects in view, the invention consists in the details of construction and in the arrangement and combination of parts to be hereinafter more fully described and particularly pointed out in the appended claims.

In describing the invention in detail, reference will be had to the accompanying drawings wherein like characters of reference denote corresponding parts in the several views; and in which, Figure 1 is a side elevation of the forward end of a lawn mower with the grass catcher associated therewith; Fig. 2, a plan view of what is shown in Fig. 1; Fig. 3, a section on the line 3—3 of Fig. 2; Fig. 4, a side elevation of a modified form of the invention, partly broken away; and Fig. 5, a plan view of what is shown in Fig. 4.

Referring to the drawings, the mower is shown as comprising tractor wheels 11 and 12, each of which is provided with a planetary gear 13. Each of the tractor wheels 11 and 12 is further provided with an inwardly projecting stub shaft upon which is rotatably mounted a plate 15. Each of these plates is provided with inwardly extending bearings 16 in which are rotatably mounted the trunnions of the rotary cutter 17 of the lawn mower. The respective trunnions of the cutter have fixed thereon a gear 18 which meshes with the planetary gear 13 of the tractor wheels whereby the rotation of said tractor wheels will produce a rotation of the cutter 17. The mower is propelled by means of the usual handle 19 secured to a bail 20, the free ends of which are non-rotatably connected to the respective plates 15. These plates 15 are provided with rearward extensions 21 and 22 respectively, said extensions being provided with corresponding slots 23 and 24 respectively, in which are slidably mounted journal blocks 25. Projecting laterally from each extension 21 and 22 at the inner ends of the slots 23 and 24 are lugs 26 and 27 respectively, in which are mounted respectively set screws 28 and 29 adapted to engage the journal blocks 25 and force same toward the forward ends of their respective slots. Journaled in the blocks 25 is a shaft 30 which carries at each end a friction wheel 31 in alinement with the tractor wheels 11 and 12 respectively, said friction wheels being held in engagement with the tractor wheels 11 and 12 by the operation of the set screws 28 and 29. The shaft 30 carries a roller 32 on its central portion and another shaft 33 journaled between the extensions 21 and 22 at their inner ends carries a roller 34 and on these rollers 32 and 34 is mounted an endless belt 35 for the purpose of conveying the cut grass into a receptacle 36. This receptacle is provided at its forward end with hook members 37 engaging in eyes 38 on the extensions 21 and 22. The rear end of the receptacle is supported by a hook 39 which engages the handle 19.

Each of the extensions 21 and 22 is provided in its outer face with a vertical groove 40 and an aperture 41 extends transversely through each extension 21 and 22 and through the bottom of the respective grooves 40. Mounted for travel in each of the grooves 40 is a plate 42 provided with a plurality of openings 43 adapted to be brought into alinement with the openings 41 so that a bolt 44 may be passed through the openings 41 and 43 and the plates 42 secured in different adjustments with respect to the extensions 21 and 22. The lower ends of these plates 42 form journal bearings for a ground roller 45 by means of which the extensions 21 and 22 may be adjusted at different elevations with respect to the ground during the travel of the mower.

In the modified form illustrated in Figs. 4 and 5, the tractor wheels 11 and 12 are provided respectively with an ordinary spur gear 46, while the plates 16 are extended rearwardly in the form of a casing 47, in which is housed a pair of gears 48 and 49 which derive their movement from the meshing of the gear 48 with the gear 46 carried by the tractor wheels. The plate 15 is extended rearwardly beyond the gear 49 and has journaled therebetween a shaft 50 which has fixed on each end a gear 51 meshing with the respective gear 49. This shaft 50 is provided intermediately with a roller 52 which forms the forward support for the endless belt 35. In all other respects, the device shown in Figs. 4 and 5 is similar to that shown in Figs. 1, 2 and 3.

What is claimed is:—

1. The combination with a lawn mower including tractor wheels, rotary cutting blades, and a handle; of a pair of spaced plates supported by the tractor wheels and having corresponding slots therein, a journal block slidably mounted in each of said slots, a shaft journaled in said blocks, a friction wheel mounted on each end of the shaft in alinement with the respective tractor wheels, means for moving said journal blocks toward the tractor wheels, whereby said friction wheels are held in engagement with the tractor wheels, a second shaft journaled between said plates, an endless belt mounted on said first and second named shafts, and a basket supported by said plates and said handle at the delivery end of said belt.

2. The combination with a lawn mower including tractor wheels, rotary cutting blades, and a handle; of a pair of spaced plates having their outer ends supported upon the tractor wheels respectively and having corresponding slots therein, a laterally projecting lug on each plate at the inner ends of said slots respectively, a set screw mounted in each of said lugs, journal blocks slidably mounted in each of said slots, and engaged by a respective set screw, whereby said blocks may be forced toward the adjacent tractor wheel, a shaft journaled in said block, a friction wheel mounted on each end of the shaft in alinement with the respective tractor wheels, a second shaft journaled between said plates, an endless belt mounted on said first and second named shafts, and a basket supported by said plates and said handle at the delivery end of said belt.

In testimony whereof, I affix my signature, in presence of two witnesses.

ELMER C. SIEBERT.

Witnesses:
CHARLES S. LIPPMAN,
EDWARD F. SCHOTT.

---

Copies of this patent may be obtained for five cents each, by addressing the "Commissioner of Patents, Washington, D. C."